US008051489B1

(12) United States Patent
Montenegro

(10) Patent No.: US 8,051,489 B1
(45) Date of Patent: Nov. 1, 2011

(54) SECURE CONFIGURATION OF A WIRELESS SENSOR NETWORK

(75) Inventor: Gabriel E. Montenegro, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1745 days.

(21) Appl. No.: 11/083,494

(22) Filed: Mar. 18, 2005

(51) Int. Cl.
*G06F 7/04* (2006.01)

(52) U.S. Cl. .............................. 726/29; 726/26; 713/187

(58) Field of Classification Search .................... 726/23, 726/25–29; 380/277; 713/187
See application file for complete search history.

(56) References Cited

U.S. PATENT DOCUMENTS

| 7,234,063 B1 * | 6/2007 | Baugher et al. ............... 713/189 |
| 2002/0014115 A1 * | 2/2002 | Young et al. .................... 73/146 |
| 2005/0160292 A1 * | 7/2005 | Batthish et al. ............... 713/201 |
| 2005/0285734 A1 * | 12/2005 | Sheynman et al. ...... 340/539.21 |
| 2006/0085637 A1 * | 4/2006 | Pinkas .......................... 713/168 |

* cited by examiner

*Primary Examiner* — Kim Vu
*Assistant Examiner* — Suman Debnath
(74) *Attorney, Agent, or Firm* — Osha • Liang LLP

(57) ABSTRACT

A method for secure configuration of a sensor system involves identifying a new sensor not activated within the sensor system, the new sensor including a new sensor identifier, establishing a first transmission link between the new sensor and a sensor controller, transmitting the new sensor identifier between the sensor and the sensor controller, generating a key pair for the sensor controller, the key pair including a controller public key and a controller private key, generating a key pair for the new sensor, the key pair including a sensor public key and a sensor private key, transmitting the controller public key to the new sensor and the sensor public key to the sensor controller, and generating a pairwise key within the sensor controller and the new sensor.

18 Claims, 5 Drawing Sheets

SECURE CONFIGURATION OF A WIRELESS SENSOR NETWORK

BACKGROUND

Sensor systems exist in everyday life, measuring temperature, determining moisture content, determining the chemical content of soil, etc. Such systems often include sensors coupled to a sensor controller. The sensor is used to provide sensory data or other information to the sensor controller, and the sensor controller operates on that information in some manner.

Many of these sensor systems are configured to use a physical link, such as a wire or other physical device, coupling the sensors and the controller. Other sensor systems are wireless means to transfer information between sensors and sensor controllers.

SUMMARY

A method for secure configuration of a sensor system includes identifying a new sensor not activated within the sensor system, the new sensor having a sensor identifier, and establishing a first transmission link between the new sensor and a sensor controller. The new sensor then transmits the new sensor identifier to the controller.

At any time prior to transmitting key information to the other device, the controller and the new sensor each generate public and private key pairs. The controller and the new sensor each transmit their public keys to the other. Once a device has received the needed public key of the other, that device generates a pairwise key using any appropriate algorithm, such as using a Diffie-Hellman algorithm.

In one or more embodiments of the present invention, the method proceeds with the new sensor transmitting a join request to the controller. In response, the controller verifies that whether the sensor identifier is present in a list of authorized sensors, authenticates the join request, and sends information to the sensor indicating the sensor is activated.

Authenticating the join request may include verifying a digital signature, or verifying a message authentication code.

Should it be determined that a sensor should no longer be allowed access to system information, a new group key is generated and transmitted securely to other devices remaining in the system, such as other sensors. This new group key is used for subsequent information transmission.

A sensor system includes a sensor controller operatively connected to a storage media for storing information relating to sensors, and a first sensor wirelessly coupled to the controller. The first sensor and the controller are each configured to authenticate information transmitted to it by the other, using digital signatures, or any other appropriate technique. Correspondingly, the first sensor and the controller may each be configured to use a public key to digitally sign the information to be transmitted, prior to transmission.

A new sensor may be added to the sensor system by receiving a digitally signed join request including a new sensor identifier. In response to receiving the join request, the controller determines whether the new sensor identifier is present in a list of authorized sensors, authenticates the join request, and stores information within the storage media indicating that the sensor has been activated. The controller then sends information to the new sensor indicating the new sensor is activated.

Other aspects of the invention will be apparent from the following description and the appended claims.

DETAILED DESCRIPTION

Figure 1:
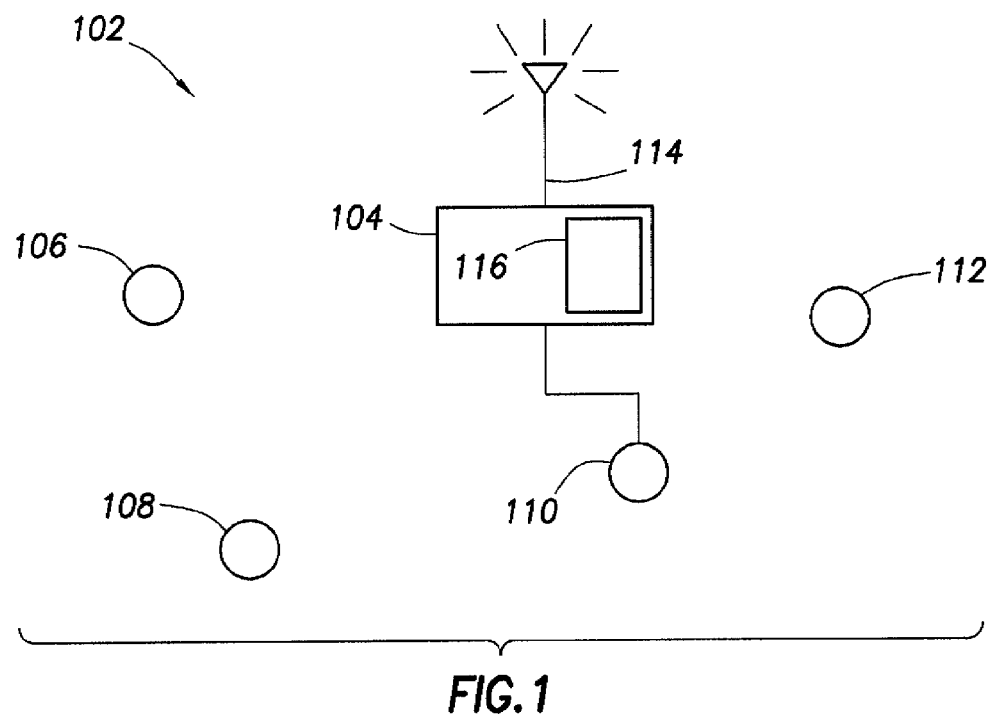
FIG. 1 is a functional block diagram of a wireless sensor system according to one or more embodiments of the present invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a wireless sensor network and a method for adding and removing sensors from that network is provided. In one or more embodiments of the present invention, management of a sensor network includes a method for authenticating new sensors being added to a wireless network.

In one or more embodiments of the present invention, management of a sensor network includes a method for adding new sensors to a wireless network and for removing sensors from the wireless network, the adding and removing operations providing backward data secrecy and forward data secrecy respectively for the entire sensor system.

FIG. 1 is a functional block diagram of a wireless sensor system according to the present invention. In one or more embodiments of the present invention, sensor system 102 includes controller 104 and sensors 106, 108, 110, and 112. Sensors 106, 108, and 112 are wireless, and thus receive information from and transmit information to one or more wireless devices (e.g., to and from controller 104, from one sensor to another, etc.) using wireless means, such as radio frequency. Persons of ordinary skill in the art having the benefit of this disclosure will readily understand how to employ wireless transmission with sensor systems. In one or more embodiments of the present invention, sensor 110 is a traditional wire-based sensor, and is physically coupled to controller 104.

Controller 104 includes antenna 114, used to transmit information to and receive information from sensors 106, 108, and 112. Controller 104 may further include storage media 116 within which a system list (not shown) is stored, including a list of active and authenticated sensors in the sensor system 102, sensors that are not yet activated but which are authorized, etc. Other information provided in the system list may include, but is not limited to, a capability list for one or more sensors in the sensor system 102, the status of one or more sensors in sensor system 102, etc.

Controller 104 is configured to manage sensor communication and to act on information provided by sensors, e.g., sensors 106, 108, 110, and 112. In one or more embodiments of the present invention, controller 104 may be instantiated as a state machine incorporated into a larger system. Alternatively, in one or more embodiments of the present invention, controller 104 should be thought of as a set of functions, rather than a particular device. Thus, functions performed by a controller, such as controller 104, may be incorporated into one or more sensors or other devices which may operate to perform one or more functions normally thought of as relating to a controller, in addition to performing functions normally attributed to sensors, such as monitoring environmental conditions and providing data to other devices.

In one or more embodiments of the present invention, in order to securely establish a sensor system, e.g., sensor system 102, an initialization process is performed during which certain information is exchanged between a new sensor and the controller 104. Due to the sensitive nature of the information being exchanged, and because an initialization phase sets up parameters for subsequent communication between a sensor (such as sensor 210 in FIG. 2) and a controller (such as controller 104 in FIGS. 1 and 2), this initialization process needs to be as secure as possible, while also maintaining flexibility, according to one or more embodiments of the present invention.

Figure 2:
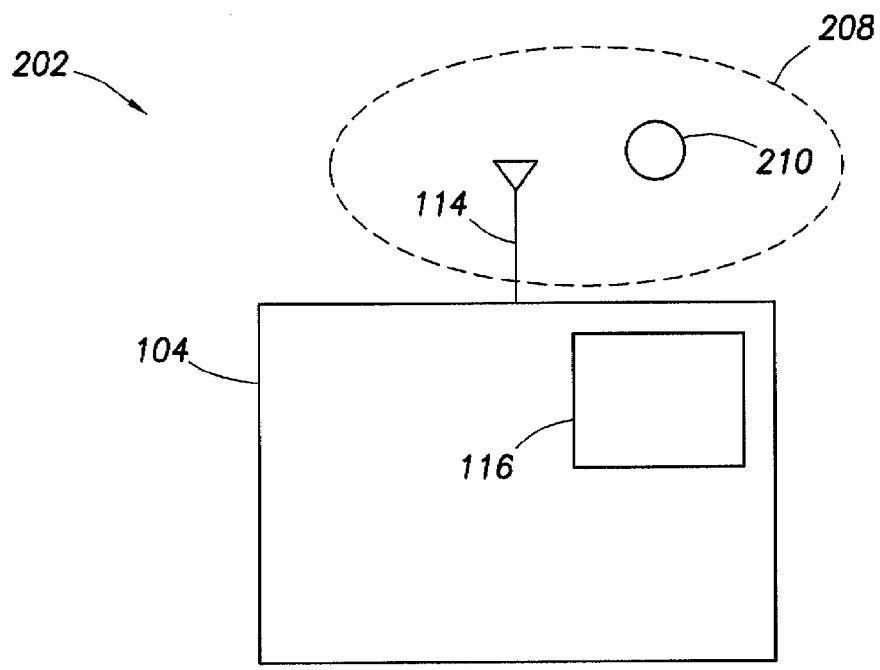
FIG. 2 is a functional block diagram of a sensor system initialization configuration according to one or more embodiments of the present invention.

FIG. 2 is a functional block diagram of a sensor system initialization configuration according to one or more embodiments of the present invention. Sensor system 202 includes sensor controller 104 having antenna 114 associated with near field communications range 208, within which sensor 210 is present. One skilled in the art will appreciate that near field communications generally involve low transmit power levels to restrict the distances over which the information being transmitted is able to be received.

By restricting the distance over which the transmitted initialization information travels, overall security is enhanced due to the reduced chance that an eavesdropper may intercept this information. Other methods of providing flexibility while maintaining enhanced security include using an intermediate device to transfer information between a controller (e.g., controller 104 in FIG. 2) and a sensor (e.g., sensor 210). Such an intermediate device could be in physical contact with either controller 104 or sensor 210 when transferring information to or from that respective device, or may use infrared or other means to transmit the information securely and wirelessly.

In one or more embodiments of the present invention, normal power levels may be used to transmit initialization information while providing the desired security by restricting the size or number of the time periods within which the initialization information may be received by the controller. For example, there could be a predetermined time period after power is activated when controller 104 accepts initialization information from sensors (e.g., sensor 210). Or, there may be a user initiated time period during which initialization processes may occur. This initialization phase may also be performed using a physical connection (e.g. a wire) between the new sensor 210 and controller 104.

It is contemplated that at least two different sensor configurations may practice the present invention. In a first configuration, according to one or more embodiments of the present invention, where authentication of the data is the primary concern, information being transmitted between a sensor and a controller is digitally signed by the originator prior to being transmitted. Persons of ordinary skill in the art will readily appreciate that any suitable public key method may be employed to digitally sign the information, such as RSA, Elliptic Curve Cryptography (including using Diffie-Hellman-style shared keys), etc.

In a second configuration, in systems where data secrecy is an issue, encryption techniques may be employed within sensors and controllers to encrypt the information prior to transmission, and to decrypt the information after receipt. When using encryption, the transmitted encrypted information is not easily able to be intercepted and understood by unauthorized parties. Further, authenticity of the information is verified when a receiving sensor or controller successfully decrypts the incoming information using the most current key being used in the system.

In one or more embodiments of the present invention, a sensor system configuration includes one or more controllers (e.g., controller 104) and one or more sensors (e.g., sensor 210) each configured to transmit and receive encrypted data. Any of the various well known encryption algorithms may be employed, using public keys, pairwise keys, or group keys that provide such functionality.

During initialization, controller 104 receives an identifier unique to sensor 210, with optional additional information, which may include information from sensor 210 as to its capabilities, location, security configuration, etc. Controller 104 adds this information into storage media 116 for later use.

At this time, controller 104 and sensor 210 each possess or need to generate a key pair for use when signing data, encrypting data, or both. A key pair typically includes a public key and a private key, with the private key being kept secret within the device that created it. The public key may be transmitted to others, for use when authenticating messages sent by the device that is associated with that public key. The public key may also used by a receiving device when creating a pairwise key for use in encryption, if desired.

Further, controller 104 and sensor 210 swap public keys, which are unique to themselves, for later use when sensor 210 joins the sensor system 202 as an active sensor providing information. Further information as to the initialization process will be presented later.

Storage media 116 may include any type of memory desired by a designer of sensor system 202, such as flash memory, electrically erasable programmable read only memory, volatile or nonvolatile random access memory, a hard disk drive, or any other suitable storage media. Storage media 116 needs to be available to controller 104 but need not be located directly on controller 104.

Once the initialization process is complete, the controller optionally provides an acknowledgement to the new sensor 210 that it is now authorized to join the network to provide information and perform actions based on commands issued from a controller (e.g., controller 104).

Figure 3:
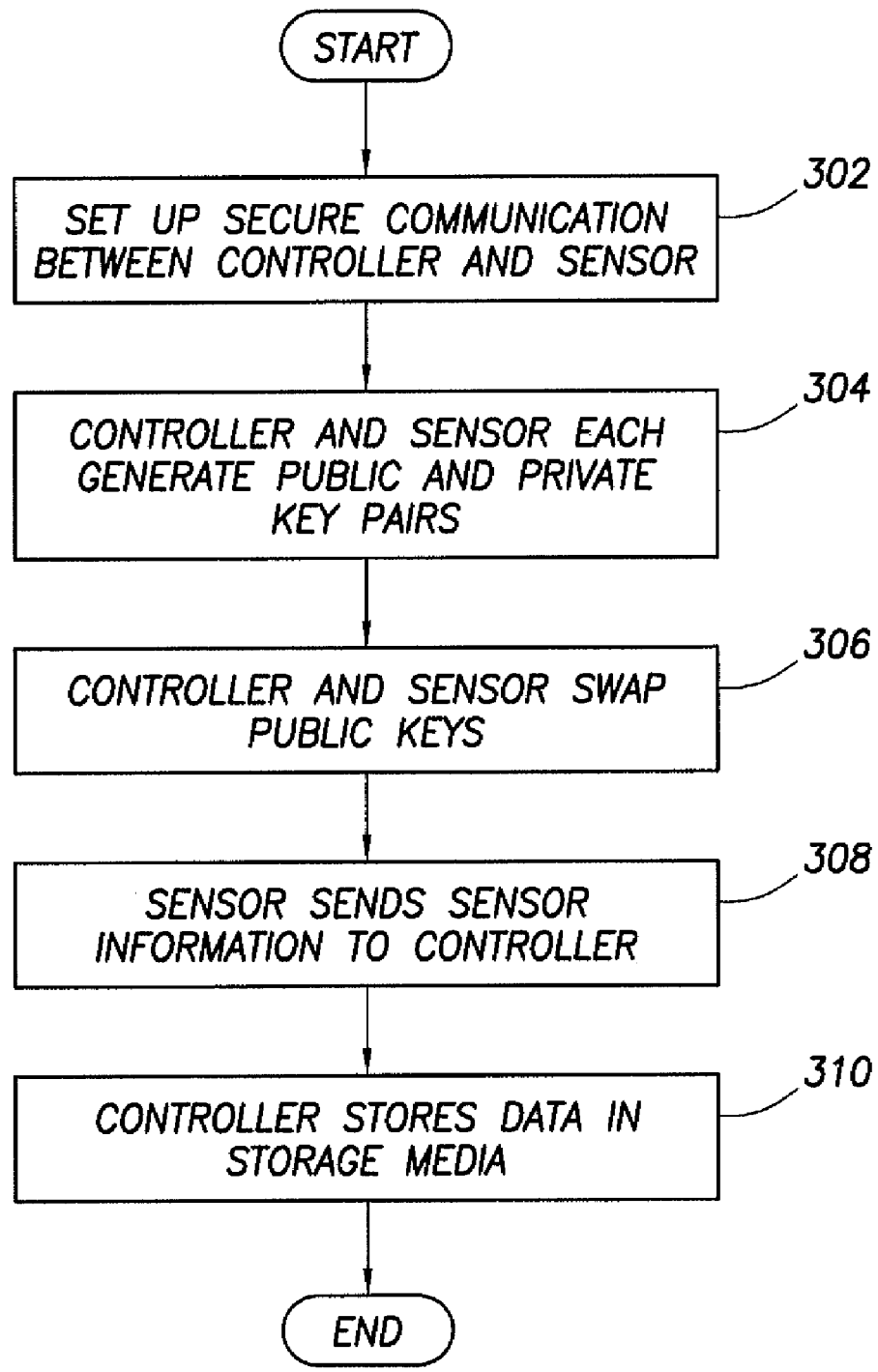
FIG. 3 is a flowchart of technique according to one or more embodiments of the present invention.

FIG. 3 is a flowchart of a technique according to one or more embodiments of the present invention. In one or more embodiments of the present invention, the technique begins at block 302 when secure communication is established between the sensor (e.g., sensor 210) and the controller (e.g., controller 104 as shown in FIG. 2). As previously explained, this secure communication may be accomplished through the use of near field communication, infrared techniques, sound, etc.

At block 304, the controller and the sensor each create individual public and private key pairs using a public key method. Persons of ordinary skill in the art having the benefit of this disclosure will readily understand public key techniques that may be employed in the practice of the present invention. Such technologies may include Elliptic Curve Cryptography, RSA, etc. Some public key methods are primarily used for authentication (e.g., through the use of digital signatures) while others additionally provide data security through encryption of the information to be transmitted.

At block 306, the controller and the sensor swap public keys (i.e., each provides its own public key to the other). The controller ultimately uses the public key associated with the sensor to identify it. Should it be desired to use a different network identifier for the sensor, that network identifier may be generated by either the controller or the sensor and transmitted to the other at that time. Such an identifier may be a collection of bits arranged in a unique order, a crypto-based identifier, or another identifier desired by system designers.

Once public keys have been exchanged, sensor 210 and the controller 104 each have the information each needs to create a pairwise key which is used to authenticate information sent by one to the other. Other authentication means may be employed, such as the use of message authentication codes (MAC's). In one or more embodiments of the present invention, information sent by the controller to sensors or by sensors to the controller includes a MAC.

If additional security is desired, pairwise keys suitable for encryption of data may also be created, based on the public and private keys the sensor and the controller now possess.

At block 308, the sensor optionally sends data (e.g., sensor information) to the controller relating to the capabilities and configuration of the sensor (e.g., sensor 210). To ensure the authenticity of information being transmitted by either sensor 210 or controller 104 to the other, the information is digitally signed, a MAC is provided, or the information is optionally encrypted, depending on the needs of the system 102. The digital signature method may use the private key of the originator, or a pairwise key developed using the public key of the receiver and the private key of the originator. Persons of ordinary skill in the art having the benefit of this disclosure will readily appreciate that other key types or data authentication methods may be employed, while remaining within the scope and spirit of the present invention.

At block 310, the controller stores at least a portion of the information received from the sensor in its storage media (e.g., storage media 116). In one or more embodiments of the present invention, the information stored in the storage media includes one or more of a unique identifier associated with the sensor (e.g., sensor 210), capability information, and configuration information.

Figure 4:
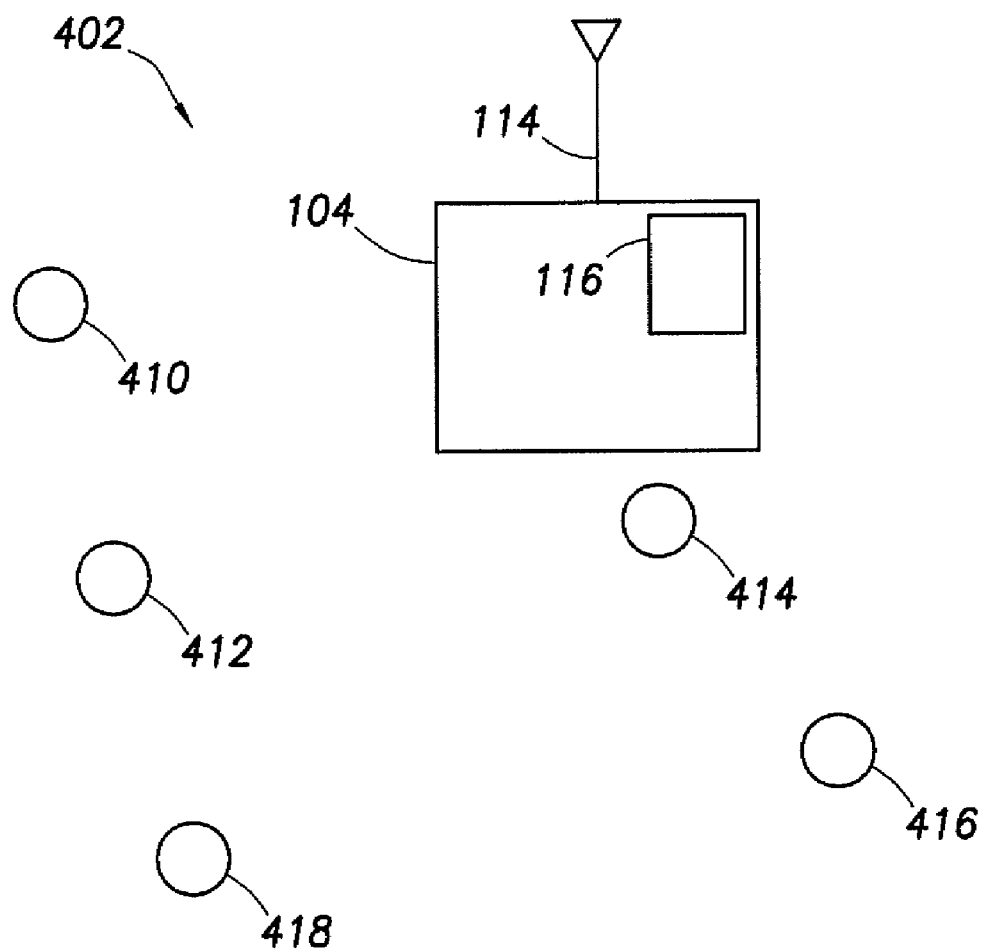
FIG. 4 is a functional block diagram of a sensor system in accordance with one or more embodiments of the present invention.

FIG. 4 is a functional block diagram of a sensor system in accordance with one or more embodiments of the present invention. In one or more embodiments of the present invention, sensor system 402 includes controller 104 which itself includes storage media 116 and antenna 114. Sensor system 402 further includes sensors 410, 412, 414, 416, and 418.

In one or more embodiments of the present invention, sensor 418 is within the RF range of controller 104. Thus, controller 104 receives information directly from sensor 418 without the use of intermediate devices to retransmit the information.

In one or more embodiments of the present invention, sensor 418 is beyond the effective RF range of controller 104. When a controller, such as controller 104, and a sensor, such as sensor 418, are not within RF communication range, any information transmitted between controller 104 and sensor 418 is relayed using one or more intermediate devices, such as sensor 414.

Using one or more intermediate devices (e.g., such as sensor 414) to retransmit messages to or from controller 104 significantly increases the size of the area where sensors may be placed and still be able to provide information to and receive information from the controller 104.

Although FIG. 4 is depicted in two dimensions to minimize the complexity of this disclosure, persons of ordinary skill in the art having the benefit of this disclosure will readily recognize that using sensors or other devices as intermediate information relay points increases the size of the available space where sensors may be placed in three dimensions, because relay points may be placed anywhere within an RF range of another intermediate point.

Further, in one or more embodiments of the present invention, multiple intermediate points may exist in an information path between a given sensor (such as sensor 414) and a controller (such as controller 104). Thus, information destined for a given device (e.g., sensor 210 or controller 104) may pass through several intermediate devices before arriving at its destination.

Figure 5:
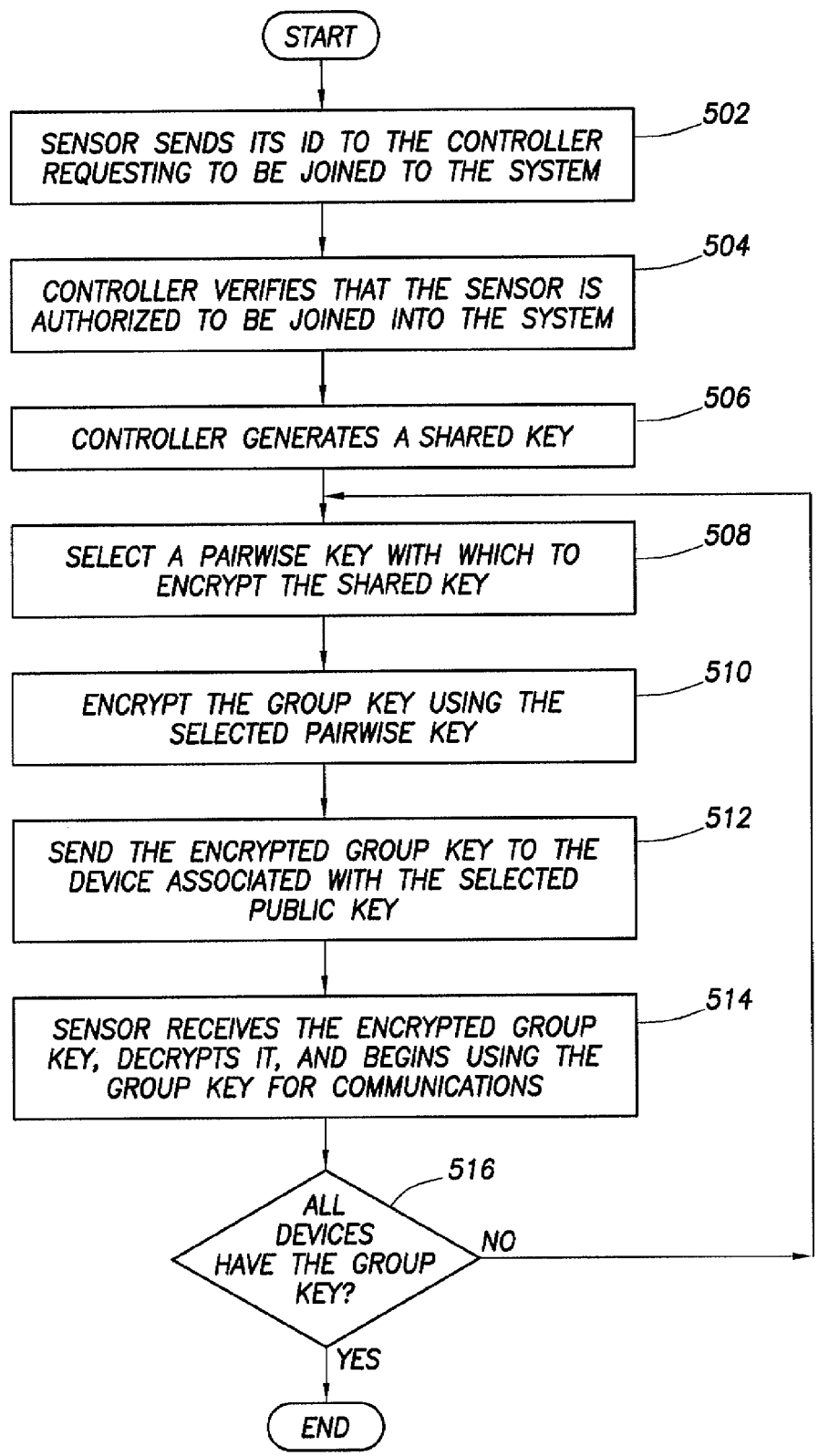
FIG. 5 and FIG. 6 are flowcharts of techniques according to one or more embodiments of the present invention.

FIG. 5 is a flowchart of a technique according to one or more embodiments of the present invention. In one or more embodiments of the present invention, sensor 418 is presently being added to sensor system 402, and has been initialized with the controller (such as controller 104 in FIG. 4), but has not yet been joined to a sensor system (such as sensor system 402 in FIG. 4) as an active sensor providing sensory data to controller 104.

Referring to FIG. 4 and FIG. 5 together, the technique begins at block 502 where sensor 418 sends information (including the sensor ID) to controller 104 requesting to be joined into the active sensor system, according to one or more embodiments of the present invention. As previously discussed, such transmitted information is digitally signed or encrypted by the originator, to ensure authenticity and optional data secrecy, as desired.

At block 504, controller 104 verifies that sensor 418 is authorized to be joined into the active sensor system. In one or more embodiments of the present invention, the controller verifies authority for sensor 404 to be in the sensor system by determining whether the identifier (ID) for sensor 404 is present in a list stored in storage media (such as storage media 116 in FIG. 4). In one or more embodiments of the present invention, the controller also verifies the authenticity of the join request itself by verifying the digital signature or MAC provided with the request, as necessary. If the authentication and authority are verified, the controller proceeds with the join process.

At block 506, the controller optionally generates a new group key which is shared by all devices for digitally signing or encrypting data within the sensor system, as may be appropriate. In one or more embodiments of the present invention, the new group key is a hash of the pairwise keys of the various devices present in the sensor system. For example, in sensor system 402 having controller 104, and sensors 410, 412, 414, 416, and 418, the group key is of the form $H(P_{410}, P_{412}, P_{414}, P_{416}, P_{418})$, where H represents a hash function of the pairwise keys of the respective sensors. Persons of ordinary skill in the art having the benefit of this disclosure will readily understand that the hash function used in one or more embodiments of the present invention may vary, as long as the result is a reliable group key.

Other methods for developing a group key may be employed. For example, in one or more embodiments of the present invention, controller 104 determines a group key without using any of the pairwise keys, or alternatively using a plurality but not all of the pairwise keys.

The development and use of a group key is optional, and will be used primarily in those systems requiring higher levels of information security, such as when encryption of transmitted information is desired.

At block 508, the controller selects a pairwise key to use to encrypt the group key, for transmission to the sensor or other device that is associated with the selected pairwise key.

At block 510, the controller encrypts the group key using the selected pairwise key. At block 512, the controller sends the encrypted group key to the sensor or other device that is associated with the selected pairwise key.

At block 514, the sensor associated with the selected pairwise key receives the information, decrypts it and begins using the new group key for communications within the sensor system. At block 516, it is determined whether devices exist which have not yet received the new group key. If so, the technique proceeds again at block 508 when a new pairwise key (associated with a sensor or other device that has not yet received the new group key) is selected for use when encrypting the group key.

By creating a new group key and sending that new group key to each device in the sensor system each time a new sensor is added, new sensors can participate in the sharing of data within the system with previously joined sensors and the controller. However, new sensors are not able to decrypt information which may have been received prior to the new group key being created, since the prior information was encrypted using a group key that the new sensor doesn't have. The condition of only allowing new sensors to decrypt and review information transmitted after they have been properly joined to the system is called backward secrecy, since the new sensor cannot read data that was produced prior to that sensor being accepted into the system, or backward in time.

At some time during the operation of the sensor system, it may become necessary for controller 104 to remove a sensor's (such as sensor 412) ability to communicate with other devices within the sensor system.

In one or more embodiments of the present invention, a sensor is removed from the sensor system when a new group key is created without using the pairwise key of the sensor or other device being removed. That new group key is then distributed to all sensors or other active devices in the sensor system. Controller 104 further updates information in a list in storage media 116 to reflect that the removed sensor is no longer authorized to receive data. The sensor being removed can no longer participate in the sensor system or decrypt transmitted information because that removed sensor is not in possession of the new group key.

Figure 6:
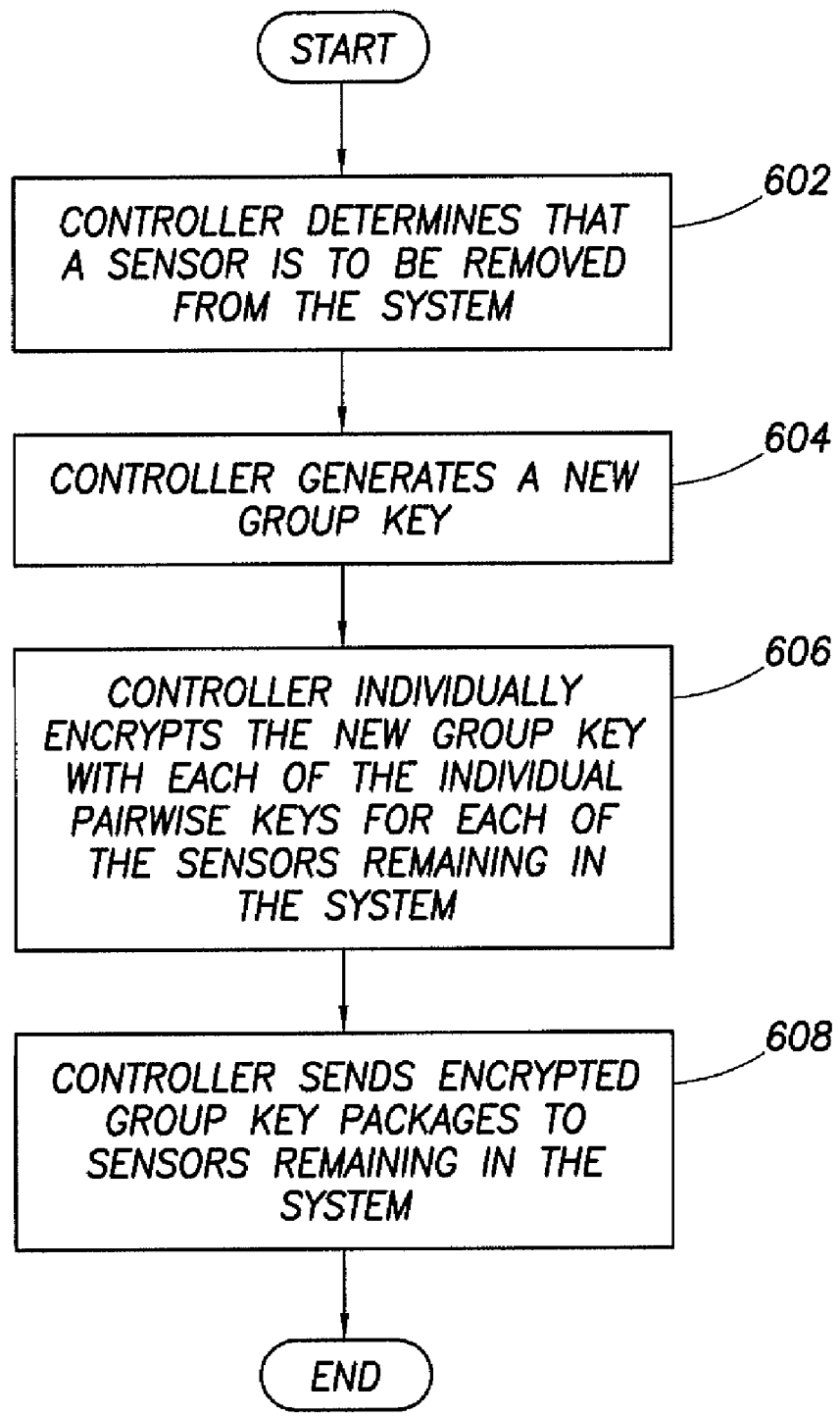

FIG. 6 is a flowchart of a technique according to one or more embodiments of the present invention. Referring to FIG. 4 and FIG. 6 together, the technique proceeds at block 602 when the controller (such as controller 104 in FIG. 4) determines that a sensor (such as sensor 412) needs to be removed from the sensor system (such as sensor system 402), according to one or more embodiments of the present invention.

At block 604, the controller generates a new group key which, in one or more embodiments of the present invention, is a hash of the pairwise keys associated with active devices in sensor system. Persons of ordinary skill in the art having the benefit of this disclosure will readily understand how to create a suitable group key for practicing the present invention.

At block 606, the controller encrypts the group key using various pairwise keys associated with various sensors or other devices in the system. At block 608, the controller sends the various encrypted information packages to the various remaining sensors and other devices associated with the pairwise keys that were used to encrypt them. For example, controller 104 will use the pairwise key associated with sensor 412 to encrypt the group key, and will send that encrypted information to sensor 412, and so on for all other devices needing the new group key.

By creating a new group key each time a sensor is removed from the system, only sensors still within the system can participate in the sharing of data. Sensors leaving the system are not able to decrypt information encrypted using the new group key, since the later encrypted information is encrypted using a group key that the removed sensor doesn't have. The condition of not allowing old sensors to decrypt and review information after they have left the system is called forward secrecy, since an old sensor cannot read data that was produced after that sensor left the system, or forward in time.

Persons of ordinary skill in the art having the benefit of this disclosure will readily recognize that blocks 606 and 608 described herein may accomplish substantially similar tasks as previously described with respect to block 508, 510, 512, 514, and 516 of FIG. 5. Other techniques may also be used, while remaining within the scope and purpose of the present invention.

The sensor system described herein provides security in that a sensor may not join the system unless it has been properly authenticated by the controller prior to the actual join sequence. It further provides backward and forward data secrecy, since a sensor cannot decrypt information it receives prior to joining the system, or after leaving the system, even if that sensor is within range of the system and is picking up the encrypted data transmissions. Further, sensors may easily be added to and removed from the system without having to relocate wires.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for secure configuration of a sensor system comprising:

identifying a new sensor not activated within the sensor system, the new sensor comprising a new sensor identifier;

establishing a first transmission link between the new sensor and a sensor controller;

transmitting the new sensor identifier between the sensor and the sensor controller;

generating a key pair for the sensor controller, the key pair comprising a controller public key and a controller private key;

generating a key pair for the new sensor, the key pair comprising a sensor public key and a sensor private key;

transmitting the controller public key to the new sensor and the sensor public key to the sensor controller;

generating a pairwise key between the sensor controller and the new sensor;

generating a group key to encrypt data that is shared by the new sensor and an existing sensor activated within the sensor system, wherein the group key is generated by the sensor controller using the pairwise key;

transmitting the group key to the new sensor and the existing sensor;

activating the new sensor after transmitting the group key to the new sensor;

identifying an old sensor activated within the sensor system to be removed from the sensor system;

generating a new group key;

transmitting the new group key to the existing sensor and the new sensor, wherein the existing sensor and the new sensor are activated within the sensor system, and wherein the old sensor is not provided with the group key; and deactivating the old sensor from the sensor system after transmitting the new group key to the existing sensor and the new sensor.

2. The method of claim 1 wherein the pairwise key is created using a Diffie-Hellman algorithm.

3. The method of claim 1 further comprising:
transmitting a join request by the new sensor to the sensor controller;
in response to receiving the join request, determining whether the new sensor identifier is present in a list of authorized sensors;
authenticating the join request; and
sending information to the new sensor indicating the new sensor is activated.

4. The method of claim 3 wherein authenticating the join request comprises one selected from the group consisting of verifying a digital signature provided with the join request, and verifying a message authentication code provided with the join request.

5. The method of claim 1 wherein the first transmission link comprises one selected from the group consisting of near field RF communication, infrared, sound, or where the availability of the link is limited in time.

6. The method of claim 3 wherein at least a portion of the join request and at least a portion of the information transmitted following transmission of the join request are encrypted prior to transmission.

7. The method of claim 6 wherein the encryption is performed using a pairwise key.

8. The method of claim 6 wherein the encryption is performed using a public key.

9. The method of claim 1, wherein the new group key is generated by the sensor controller using the pairwise key and an existing pairwise key of the existing sensor.

10. The method of claim 1, further comprising:
sending encrypted information to the old sensor after deactivating the old sensor from the sensor system, wherein the old sensor is unable to decrypt the encrypted information.

11. The method of claim 1, further comprising:
sending encrypted information to the new sensor before transmitting the group key, wherein the new sensor is unable to decrypt the encrypted information.

12. The method of claim 1, further comprising:
sending encrypted information to the new sensor after activating the new sensor, wherein the new sensor is able to decrypt the encrypted information.

13. A sensor system, comprising:
a new sensor configured to:
transmit a new sensor identifier to a sensor controller;
generate a key pair for the new sensor, the key pair comprising a sensor public key and a sensor private key; and
transmit the sensor public key to the sensor controller;
an old sensor activated within the sensor system; and
the sensor controller operatively connected to the new sensor and the old sensor and configured to:
identify the new sensor not activated within the sensor system, the new sensor comprising the new sensor identifier;
establish a first transmission link between the new sensor and the sensor controller;
generate a key pair for the sensor controller, the key pair comprising a controller public key and a controller private key;
transmit the controller public key to the new sensor;
generate a pairwise key between the sensor controller and the new sensor;
generate a group key to encrypt data that is shared by the new sensor and an existing sensor activated within the sensor system, wherein the group key is generated by the sensor controller using the pairwise key;
transmit the group key to the new sensor and the existing sensor; activate the new sensor after transmitting the group key to the new sensor;
identify the old sensor to be removed from the sensor system;
generate a new group key;
transmit the new group key to the existing sensor and the new sensor, wherein the existing sensor and the new sensor are activated within the sensor system, and wherein the old sensor is not provided the group key; and
deactivate the old sensor from the sensor system after transmitting the new group key to the existing sensor and the new sensor.

14. The sensor system of claim 13, wherein the new group key is generated by the sensor controller using the pairwise key and an existing pairwise key of the existing sensor.

15. The sensor system of claim 13, wherein the new sensor is further configured to:
transmit a join request to the sensor controller; and
wherein the sensor controller is further configured to:
determine whether the new sensor identifier is present in a list of authorized sensors in response to receiving the join request;
authenticate the join request; and
send information to the new sensor indicating the new sensor is activated.

16. The sensor system of claim 13, wherein the sensor controller is further configured to:
send encrypted information to the new sensor before transmitting the group key, wherein the new sensor is unable to decrypt the encrypted information.

17. The sensor system of claim 13, wherein the sensor controller is further configured to:
send encrypted information to the new sensor after activating the new sensor, wherein the new sensor is able to decrypt the encrypted information.

18. The sensor system of claim 13, wherein the sensor controller is further configured to:
send encrypted information to the old sensor after deactivating the old sensor from the sensor system, wherein the old sensor is unable to decrypt the encrypted information.

* * * * *